Jan. 4, 1927.
C. C. CAREK
1,613,440
PORTABLE DESK FOR AUCTION CLERKS
Filed Feb. 16, 1925     3 Sheets-Sheet 1
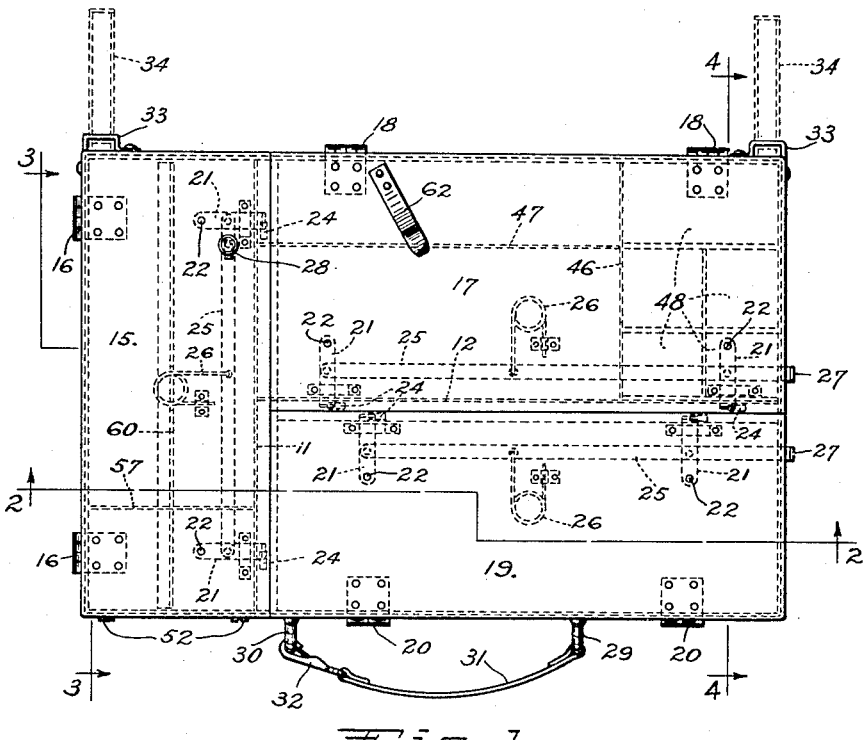
Fig-1-
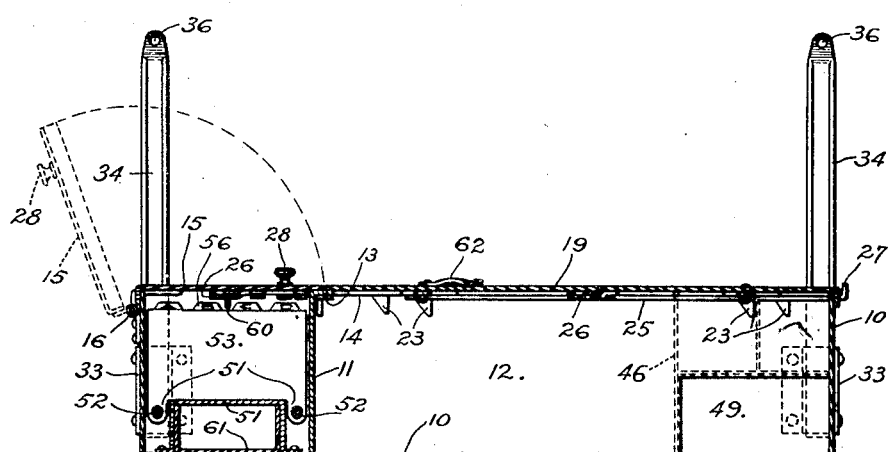
Fig-2-
Inventor:
C.C. Carek.
Witness:
R. J. Honomichl.
By David O. Barnell,
Attorney

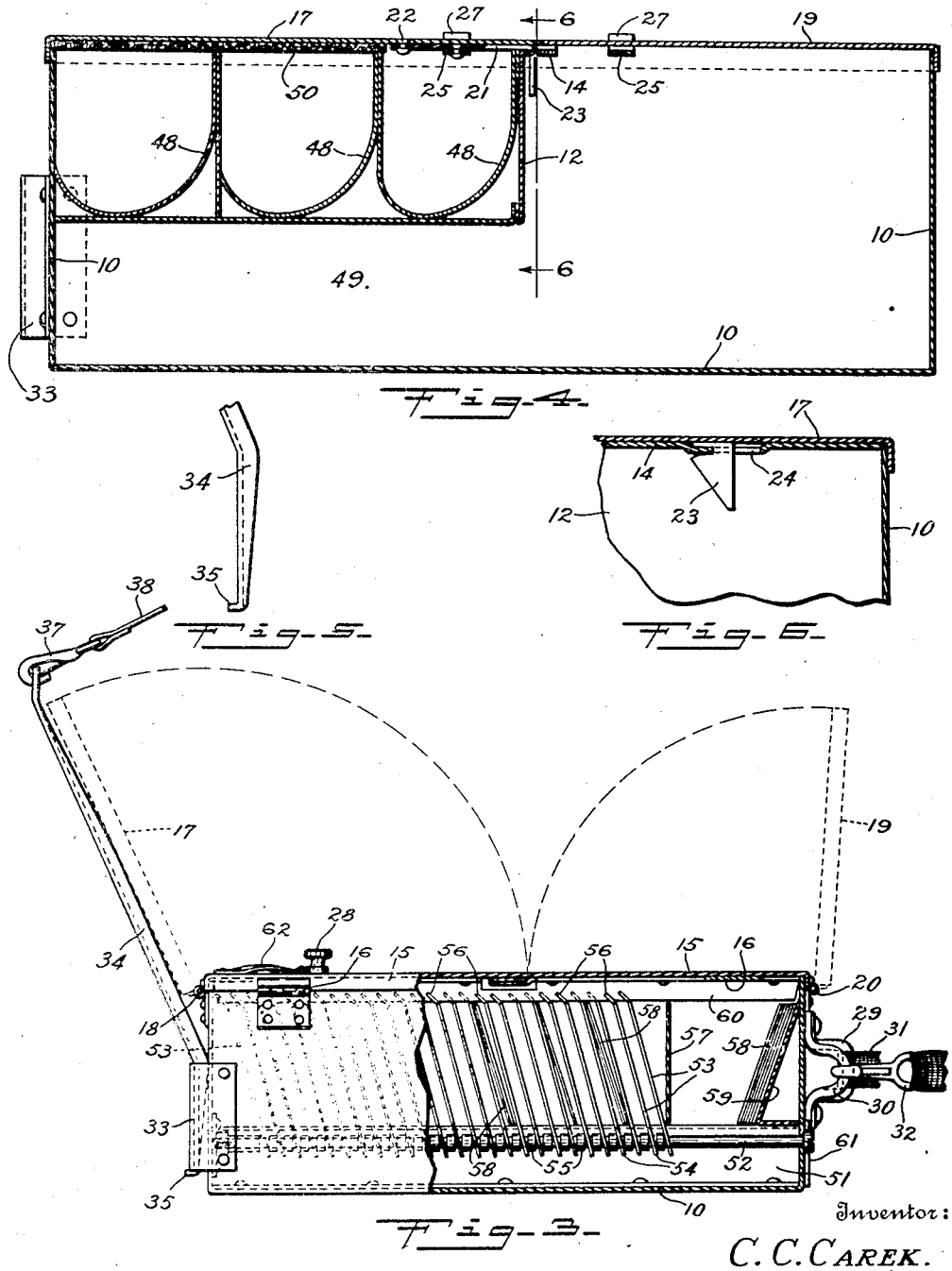

Jan. 4, 1927.　　　　　　　　　　　　　　　　1,613,440
C. C. CAREK
PORTABLE DESK FOR AUCTION CLERKS
Filed Feb. 16, 1925　　　3 Sheets-Sheet 3
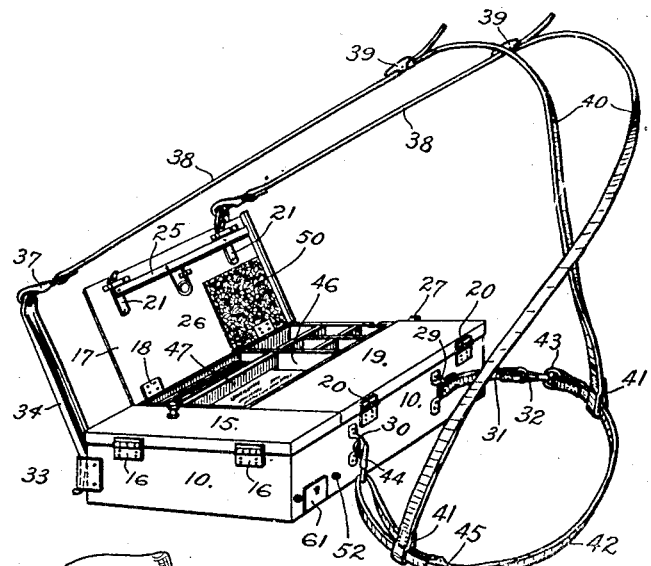
Fig-7-
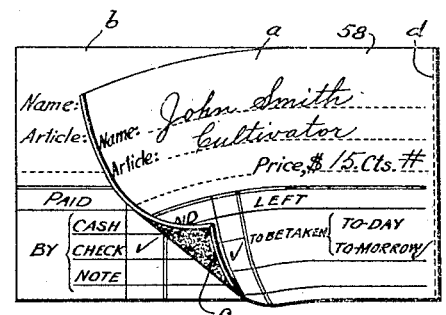
Fig-9-
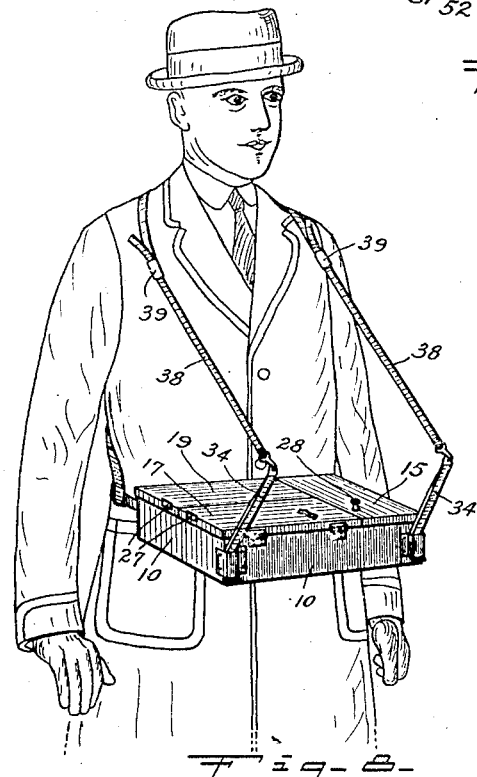
Fig-8-
Witness:
R. J. Honomichl.
Inventor:
C. C. CAREK.
By David O. Barnell
Attorney Patented Jan. 4, 1927.

1,613,440

UNITED STATES PATENT OFFICE.

CHARLES C. CAREK, OF TOUHY, NEBRASKA.

PORTABLE DESK FOR AUCTION CLERKS.

Application filed February 16, 1925. Serial No. 9,572.

My invention relates to portable desks, cabinets, or analogous devices adapted to be carried upon the person when in use, and intended to facilitate the recording, filing, checking and accounting of sales. It is the object of my invention to provide a device of this general character especially adapted for use by clerks of auction sales. My invention is particularly applicable under the conditions usually existing at auction sales of farm products, agricultural equipment, livestock, and the like, in which the articles sold are in scattered locations, usually in the open air, so that the auctioneer, clerk and bidders move about from place to place as the various items are inspected and offered for sale. In such sales it is the duty of the clerk to make a record of the articles as the same are sold, the record showing the name of the buyer, the price bid, how and when payment made or to be made by the bidder, and the time when delivery of the article is to be made to the buyer. The clerk also receives the payments from the buyers, gives receipts for such payments, and at the end of the sale makes settlement with the auction-holder, by turning over to the latter the receipts and records of the sale. The device provided by my invention is adapted to facilitate the carrying out of all of the above mentioned duties of the clerk, by enabling the performance thereof with a minimum of exertion, confusion, or liability to error; and substantially preventing interference with or interruption of the work by weather conditions such as wind or rainfall.

In the accompanying drawings Fig. 1 is a plan view of a device embodying my invention, as arranged for carrying the same when not in use, Fig. 2 is a longitudinal section on the line 2—2 of Fig. 1, Fig. 3 is a partial end view and partial transverse section on the line 3—3 of Fig. 1, Fig. 4 is a transverse section on the line 4—4 of Fig. 1, Fig. 5 is a detail side view of a portion of one of the detachable standards for the supporting straps, Fig. 6 is a detail section on the line 6—6 of Fig. 4, Fig. 7 is a perspective view of the device as a whole, showing the supporting straps connected therewith, and the lid of one compartment opened, Fig. 8 is a perspective view of the device as carried by the user, and Fig. 9 is a perspective view of one of the record-cards or tickets provided for use in connection with the device.

In carrying out my invention I provide a rectangular box or cabinet which is made of sheet-metal, and is of the approximate size and proportions, relative to the body of the user, shown in Fig. 8. When in use the box or cabinet is supported in a horizontal position, extending out from the front of the body approximately at the waist, or so that the upper surface of the cabinet is at a level enabling the user to rest his forearm thereon in a convenient position for writing. The main body 10 of the box or cabinet is a relatively shallow rectangular tray, open at the upper side, and divided into three principal compartments by means of the vertical partition-plates 11 and 12 having at their upper edges the flanges 13 and 14, respectively, which extend horizontally at the level of the upper edges of the body 10. The partition-plate 11 extends transversely of the body 10, adjacent to the left-hand end thereof, and forms at said end of the cabinet the file compartment which is covered by the lid 15, said lid being connected with the adjacent end-wall of the body by hinges 16. The partition-plate 12 extends longitudinally from the intermediate portion of the transverse plate 11 to the opposite end of the body 10. At the front of said plate 12 is formed the cash compartment which is covered by the lid 17, the latter being connected with the front wall of the body by the hinges 18. At the rear of the plate 12 is the storage compartment which is covered by the lid 19, the same being connected with the rear side-wall of the body by the hinges 20. The outer edges of the lids 15, 17 and 19 are flanged or turned downwardly over the side-walls of the body 10, and the inner edges of the lids, when closed, rest upon the flanges 13 and 14 of the partition-plates, being thereby supported and alined with each other. The adjacent edges of the lids are fitted closely together, so that their combined surfaces form a smooth table or desk suitable for use in writing. For holding the same closed, each of the lids is provided with a pair of latch-plates 21, pivotally connected with the lid by pins 22, the swingable ends of the latch-plates having downwardly turned, beveled, laterally notched portions 23 adapted to pass through slots 24 in the flanges 13 and 14. The notched edges of the latch-members 23 engage the flanges as shown in Fig. 6, and may be disengaged therefrom by a slight swinging of the latch-plates about the pivot-pins 22. On each lid the pair of latch-plates is controlled by a bar 25 which is pivotally connected therewith so as to move them in parallelism. A spring 26 is attached to the lid, and one end of the spring is connected with the latch-bar 25 so as to tend to move the same in a direction for holding the latches in engaged position. For releasing the latches, the bars 25 are actuated manually, the bars on the lids 17 and 19 being extended through the end-flanges of said lids, and having upturned ends 27 which may be conveniently grasped and pulled. On the lid 15 the latch-bar is actuated by means of a knob 28, which is connected with the bar by a pin extending through a slot in the lid.

At the rear side of the body 10 are affixed the metal loops 29 and 30, and to the loop 29 is attached one end of a strap 31 which is provided at the opposite end with a snap 32. By connecting said snap 32 with the loop 30, as shown in Fig. 1, a convenient handle is formed for carrying the device when the same is not in use, and at such times the cabinet resembles a small suitcase. At the front corners of the body 10 are secured the socket-members 33 which are adapted to receive detachably the lower portions of the standards 34. Said portions of the standards are slightly tapered toward their lower ends, and at said ends are turned out the lugs or lips 35 which are adapted to hook beneath the lower ends of the socket-members, as best indicated in Fig. 3. By slightly tilting the upper portions of the standards forwardly, so that the same move pivotally about the upper ends of the sockets, the lips 35 are disengaged from the lower edges of the sockets, after which the standards may be withdrawn from the sockets. The upper portions of the standards are inclined forwardly from the sockets, and at the upper ends have the holes 36 for engagement with snaps 37 on the front ends of the straps 38. The opposite ends of said straps 38 are adjustably connected with buckles 39 on the shoulder-straps 40. The opposite ends of said straps 40 are formed into loops 41 which fit slidably about the belt 42. At one end said belt has a ring 43 adapted for connection with the snap 32 on the handle-strap 31. At the opposite end the belt has a snap 44 adapted for connection with the loop 30. The belt-strap is looped through the snap 44 and returned to a buckle 45, by adjustment of which the effective length of the belt may be varied.

When the device is not in use, the standards 34, straps 38 and 40, and belt 42 may be placed in the storage compartment which is covered by the lid 19, the handle-strap 31 being then connected with the loop 30, as before described. When the device is to be used, the snap 32 of the handle-strap is disengaged from the loop 30 and the belt-snap 44 engaged with said loop. The standards 34 are then inserted in the sockets, the straps 40 arranged over the shoulders of the user so that said straps cross at the back between the shoulders and waist, and the snap 32 is then connected with the ring 43 of the belt. The effective length of the belt being suitably adjusted by means of the buckle 45, and the effective length of the shoulder-straps being adjusted at the buckles 39, the device is supported in a horizontal position at the waist of the user, as shown in Fig. 8. The height of the standards 34 is such that the straps 38 are elevated from the desk-surface formed by the lids 15, 17 and 19, and said straps thus do not interfere with the free movement of the hands and forearms of the user over said desk-surface. By the forward inclination of the standards, interference thereof with the opening of the lids 15 and 17 is avoided, and one of the standards serves as a support for the lid 17 when said lid is swung forward to the position shown in Fig. 7 and by dotted lines in Fig. 3. The lid 19 of the storage compartment may be raised to a vertical position, as shown by the dotted lines in Fig. 3, said lid being then against the front of the user's body, but this lid will not remain in open position unless held. The lid 15 of the file compartment may be opened as indicated by dotted lines in Fig. 2, and this lid may be left in open position when desired.

The front or cash compartment, covered by the lid 17, has a transverse vertical partition 46 and a longitudinal partition 47. At the right of the partition 46 are the coin-cups 48 of which the bottoms are rounded to facilitate removal of coins therefrom. The coin-cups do not extend the full depth of the body 10, and the chamber 49 beneath the cups is connected with the rear storage compartment through a rectangular opening in the partition-plate 12, as shown in Fig. 2. A pad 50, of felt or like material, is secured to the lid 17 and adapted to fit closely over the coin-cups when said lid is closed, thereby preventing coins slipping from one of the cups to another when the cabinet is carried in the vertical position. The space at the rear of the partition 47 is adapted for containing currency, checks, notes, and the like. The space in front of said partition 47 is used for holding blank checks and notes, which are usually in pads, and are disposed vertically edgewise in the compartment.

In the bottom of the compartment at the left of the partition-plate 11 is secured an inverted U-shaped plate 51, at the sides of which are the guide-retaining rods 52. Said rods are inserted from the rear side of the body 10, their front ends being threaded and screwed into sockets therefor secured on the front wall of the body at the end of the file compartment. A series of guide-plates 53 are provided, the lower edges of said plates resting upon the plate 51, and each plate having at the ends thereof a pair of perforate lugs 54 through which the rods 52 pass loosely. Upon said rods between the lugs 54 are slidably disposed the spreaders 55 which prevent the guide-plates becoming bunched closely together, while enabling said plates to be moved longitudinally of the retaining-rods to increase the spacing of the plates when required. The index tabs or lugs 56 at the upper edges of the guide-plates are marked alphabetically, and said lugs are inclined forwardly as shown, so that the index letters thereon may be readily observed by the user when looking down into the compartment. Near the rear end of the file compartment a plate 57 is extended transversely thereof above the filler-plate 51, and the space behind said plate 57 is used for containing a supply of the blank record-cards or tickets 58. An inclined plate 59 at the rear end of the compartment serves to retain the blank tickets in an approximately vertical edgewise position, and insures the provision of sufficient space at one side of the series of tickets for insertion of the fingers when it is desired to withdraw one of the blanks for use. An angle-bar 60 is secured on the lower side of the lid 15, and the vertical flange of said bar extends down between the index-tabs 56 of the guide-plates, as best shown in Fig. 2. This bar insures retention of the tickets 58 which may have been inserted between the guides 53, or the blanks contained between the plates 57 and 59, when the cabinet is carried in the vertical position, by preventing said tickets from sliding out toward the lid 15, assuming a position parallel therewith, and then dropping to the lower end of the compartment in the space adjoining the lid.

In the rear side-wall of the body 10 there may be provided a rectangular opening to communicate with the space beneath the inverted-U filler-plate 51, and a sliding drawer 61 inserted through said opening into said space. On the lid 17 of the cash compartment, near the front or hinged edge thereof, is secured a slightly bowed leaf-spring 62, said spring extending diagonally rearward as shown in Fig. 1, so that one or more of the record-cards or tickets 58 may be inserted and retained beneath the free end of the spring.

The record-cards or tickets 58 are preferably of the kind indicated in Fig. 9, each ticket comprising the duplicate slips $a$ and $b$ which are attached to each other at the right-hand end, the rear surface $c$ of the front slip $a$ being carbon-coated so that any inscription on said front slip will be reproduced on the slip $b$, and there being a scored or perforated line $d$ near the connected ends of the slips to facilitate the separation thereof when desired. The slips are printed as shown in the figure to indicate the spaces for writing the name of the article sold, name of purchaser, price to be paid, payments made by cash, note or check, and time of delivery of the article sold.

In the use of the described apparatus by the clerk of an auction sale, the cabinet or desk is supported upon the body by means of the belt and shoulder-straps, as illustrated in Fig. 8 and hereinbefore described. As each article is offered for sale by the auctioneer, the clerk writes the name of the article on the front slip $a$ of one of the blank sales-tickets, and, when the bidding is completed, writes in the name of the purchaser and the price bid by him. The entire ticket, comprising the original slip $a$ and the carbon duplicate $b$, is then placed in the indexed file, adjacent to the guide-plate having the appropriate index-letter for the name of the buyer. When placing the ticket in the file, the lid 15 may be opened with the left hand, the knob 28 being pulled rearwardly to release the latches, and the lid then raised to open position. While said lid 15 is held open the ticket is inserted in the file with the right hand, and a blank ticket removed from those contained in the space behind the plate 57, after which the lid is again closed. The recording of sales and filing of the tickets is continued in like manner as successive articles are sold. When any buyer wishes to pay for the article or articles on which he has been the successful bidder, the ticket or tickets made at the time of the bidding thereon may be instantly selected by the clerk from the alphabetically indexed file, where the tickets bearing the name of the bidder have been grouped together as filed. When a ticket has been removed from the file, and payment made for the article recorded thereon, the original ticket or slip $a$ is detached and delivered to the buyer as a receipt for the payment, while the duplicate or carbon copy on the slip $b$ is returned to the file and constitutes the clerk's record of the transaction. When receiving payments from buyers, the opening of the lid 17 provides access to the coin-cups 48 and to the compartment for currency, checks and notes, so that change may be readily provided for cash payments, or the buyers may be provided with blank checks or notes when payment is made therewith instead of cash. In making settlements with buyers before the auction is finished, and while bidding upon some article is under way, the ticket relating to such article may be inserted and temporarily held in the clip formed by the spring 62, so that both hands of the clerk are left free for the handling of the filed tickets, making change, and so on, as above described. At the completion of the auction, the entire record thereof will be contained in the indexed file, and from the tickets therein a compilation may be quickly made of all the articles sold, the names of the buyers, the amounts paid by each bidder, the character of payment made, time when articles are to be or have been delivered, and any other information which may have been noted upon the tickets. The clerk may thus immediately render a complete accounting of the sale to the auction-holder, with a minimum probability of mistakes, confusion or error in either the record of the various transactions, or the cash receipts which may have been collected by the clerk.

Now, having described my invention, what I claim and desire to secure by Letters Patent is:

1. An auction-clerk's portable desk, comprising a cabinet having filing and storage compartments, lids covering said compartments and hinged to the side-walls of the cabinet-body, releasable fastening means for holding said lids in closed positions at which their surfaces are alined in a common plane as a desk-surface, means at the rear side of the cabinet for connection with a body-belt, and standards connected with the front side of the cabinet and extending forwardly and upwardly therefrom for connection with shoulder-straps.

2. A device of the class described, comprising a cabinet having a relatively shallow rectangular body and vertical partitions dividing the same into a plurality of compartments, separate lids covering said compartments, said lids in closed position forming a desk-surface, a body belt, means connecting the same with the rear side of the cabinet, standards connected with the front side of the cabinet and extending upwardly and forwardly therefrom, shoulder-straps connected with the upper ends of said standards, said belt and shoulder-straps adapted to support the cabinet in horizontal position at the front of the body of a person, the shoulder-straps being held by the standards at an elevation above the desk-surface to enable opening of the several compartment lids and free movement of the hands and forearms above said desk-surface.

3. In a device of the class described, a cabinet having a flat top surface, means for connecting the rear portion of said cabinet to the body of a person substantially at the level of the waist, rigid members connected with the front portion of the cabinet and extending above the top surface thereof, suspending means arranged to extend forwardly from the shoulders of the person and connected with the upper ends of said rigid members whereby the suspending means while widely spaced from the top surface of the cabinet may support the latter in a substantially horizontal position and with its top surface approximately at the level of the elbows.

4. An auction-clerk's portable desk, comprising a shallow cabinet having vertical partitions dividing the space therein to form a plurality of compartments, an indexed file arranged in one of said compartments; means in another of said compartments for separately retaining coins, currency and the like; separately openable lids for the several compartments each adapted to form a desk-surface when in closed position, and means for attaching and supporting the cabinet upon the body of the user so that the desk-surfaces extend forward horizontally approximately at the waist-level of the body, said means including suspension means adapted to extend forwardly from the shoulders of the user at a substantial elevation from the desk-surface of the cabinet, and rigid members to which the front ends of said suspension members are attached, said rigid members being connected with the front portion of the cabinet and arranged in non-interfering relation with the compartment lids.

CHARLES C. CAREK.